Patented June 18, 1935

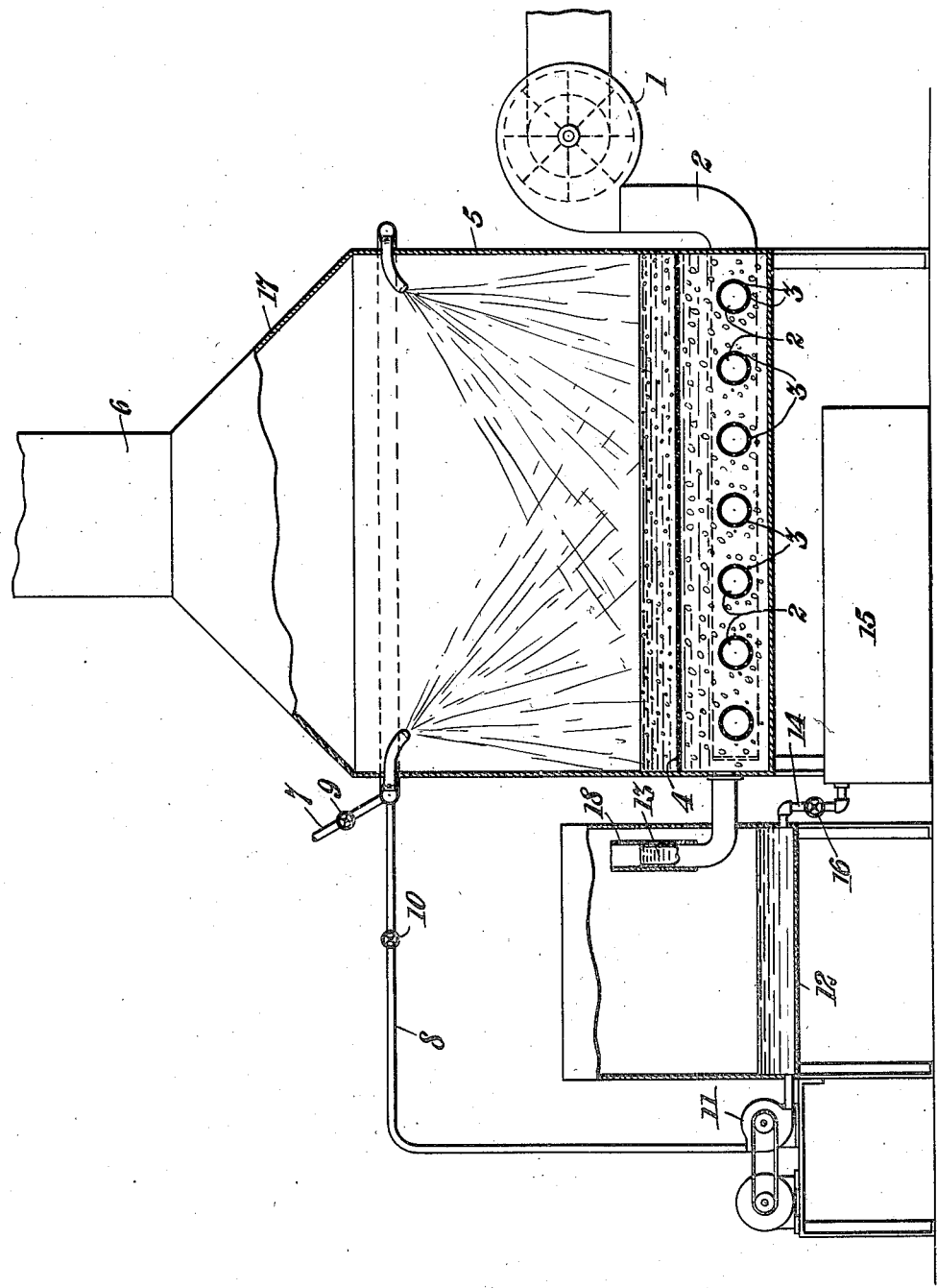

2,005,422

UNITED STATES PATENT OFFICE 2,005,422

METHOD OF CONCENTRATING WASTE LIQUORS

Clarence C. Hunicke, Palisade, and Charles L. Wagner, Boonton, N. J.

Application October 31, 1933, Serial No. 696,092

2 Claims. (Cl. 252—7)

This invention relates to a method and apparatus of concentration of sulphite waste liquors from the pulp industry for the preparation of the waste products for fuel and recovery purposes.

The waste liquors from sulphite pulp contain organic matters and calcium and/or magnesium acid sulphite compounds. These liquors are generally discharged into streams or bodies of water in the form of waste. They have great oxygen absorbing powers and decompose and pollute the waters into which they are discharged. Such means of getting rid of these products, although almost universally practiced, is therefore undesirable. Considerable expenditure for plant construction to concentrate and utilize the liquors and expensive quantities of steam for evaporation are required because of the dilute condition and corrosive properties of the waste liquors.

Numerous attempts have been made to concentrate the liquors by evaporating in multiple effect, spraying into flue gases to concentrate, spray drying, precipitating the organic matters, utilizing for fermentation and distillation to produce alcohol, but, most of such attempts have proven uneconomic.

The present invention proposes to utilize the products of the invention as fuel or fuel binder because the woody matter dissolved in the liquor has a fuel value equal to approximately 20,000,000 B. t. u. per ton pulp produced and when concentrated in accordance with this invention to about 50% solids, has a gross fuel value of 39,000 B. t. u. per gallon, at which concentration it will very readily burn without other fuel after the initial starting of combustion. Therefore, it is apparent that considerable economic value lies in this waste material provided a cheap reliable method of concentration can be had, such as the present invention, first because of the fuel conserved and made available for consumption and second because of the avoidance of stream pollution.

One of the objects of this invention is to concentrate sulphite waste liquor for use as a fuel or fuel binder.

A further object of the invention is to avoid stream pollution in the paper pulp industry by making available for use the waste matter contained in the sulphite waste liquor.

A still further object of the invention is to provide a cheap and reliable method for the concentration of waste liquors.

Referring to the drawing:

Figure 1 is a diagrammatic view of a device for carrying out our method for concentrating waste liquors.

In the sulphite paper pulp industry it is necessary to wash the pulp in order to remove the chemicals. The wash water then contains the calcium and/or magnesium acid sulphite compounds together with other chemicals and organic matters. The same process is required in the soda base acid sulphite process and the resultant wash water also contains organic and inorganic compounds. The percentage of organic matter varies in each plant which heretofore has made it difficult to concentrate the chemicals.

We have discovered that when minute bubbles of a gas or air are passed through a column of liquid that the gas will become saturated or nearly so in travelling through a relatively short distance. For instance, air can be saturated in travelling through a two inch head of water. The law seems to be, within limits, that saturation is proportional to the depth of the column and inversely proportional to the size of the bubble, as the smaller the bubble the greater the surface exposed in proportion to the weight of the gas.

In carrying out this invention we propose to use the waste gases of combustion at from 350° Fahrenheit to 650° Fahrenheit and pass them through the liquid to be concentrated to emerge at approximately 200° Fahrenheit when each cubic foot of gas will carry 200 grains if fully saturated and approximately 100 grains at approximately 45% saturation. The control of the temperature is important and we propose to secure the temperature control by controlling the height of the column of liquid. The surface of the liquid will be covered to a certain depth by supernatant foam.

The size of the bubbles must also be controlled for optimum heat and water absorption. This is accomplished by allowing the gas to rise through a screen or screens of predetermined size of mesh or through a series of perforated plates the holes of which are of predetermined size or a combination of plates and screens wherein the openings are of predetermined size. In addition to limiting the size of bubble there is a kneading effect on the bubble itself as it passes through an opening that is smaller in area than the bubble. In other words, a bubble will elongate and pass through a smaller opening than the normal spherical size. Vertical pipes might be used in place of screens or plates but are not preferred.

It can thus be seen that with a saturation of gas of 90% and 7,000 grains in each pound of water removed at 200 degrees Fahrenheit each cubic foot of gas will contain 180 grains of water. In other words, $$\frac{7000 \text{ grains}}{180 \text{ grains}} = 39 \text{ cubic foot of gas}$$

required to carry away one pound of water at 200° Fahrenheit or 63 cubic feet at 650° Fahrenheit. The 650° Fahrenheit being the supply temperature and 200° Fahrenheit being the leaving temperature of the gas. As approximately 2200 gallons of liquor will be obtained by any proper washing method from one ton of pulp or approximately 17,400 pounds of which 13,000 pounds approximately is water which must be evaporated. Then 13,000 pounds×63 cubic feet=819,000 cubic feet of gas required for necessary evaporation.

The example given above of volumes is used as an illustration only of the potential value of this method, as the specific heat of gases is a measure of total evaporation possible.

Water vapors in flue gases, while superheated (above 212° F.), must not be condensed. Volumes of gases therefore are increased according to the following:

Due to the low specific heat of flue gases, roughly .25, one pound air 600° F., cooled to 200° F., will give up approximately 100 B. t. u.

As the heat absorbed as latent heat to evaporate one pound of water from and at 212° F.=970 B. t. u., then 100 B. t. u. will evaporate 100÷970=.132 pounds water or 932 grains of water. The 69 cubic feet mentioned above will represent 3 pounds air (roughly) or .398 pounds water.

It can therefore be seen that the gases have not enough heat to evaporate the requisite water for saturation at 200° F., but will be cooled a greater degree if saturated, or not be saturated at this temperature.

It will therefore be necessary to so adjust temperature and gas volume and recirculation of liquor, also height of liquor column, so that the greatest weight of water is carried off by available heat. The water vapors in flue gases are superheated, so that for each pound water in the gases, roughly .45 B. t. u. is given up additionally for each degree of cooling down to condensation temperature.

In the ordinary power plant of most paper mills the volume of gas permitted varies from 50,000 cubic feet per minute to 200,000 cubic feet per minute, or an average of 125,000 cubic feet per minute. Therefore, the gas would evaporate the water from the liquor of one ton of pulp in $$\frac{819,000}{125,000} = 6.55 \text{ minutes}$$

In most power plants economizers are used which reduce the gas temperatures to between 350 and 450 degrees Fahrenheit which may make it necessary in some cases to provide a small conventional apparatus for final concentration. As the transportation of gases by motor or turbine driven fans will require only small power cost compared to the cost of steam for evaporation, roughly one-fifth, it will be seen that this invention is more economic and in addition the cost of equipment even if made of suitable corrosion proof metals will approximately be only 15% of the multiple effect evaporation devices while attendance and upkeep will be only negligible.

The gas from the boilers, (not shown) at any suitable temperature, is forced by fan 1 through preferably acid proof distributing pipes 2 in acid proof metal tank 5 and out through perforations 3 in said pipes passing up through the column of liquid and through screens 4, heating the liquid and absorbing water in the form of water vapor, by reason of the sensible heat of the gas to the point of equilibrium which varies with the temperature and usually is about 90% of complete saturation. The area of the perforations in the screens must be greater than the solid portion of the plate in order that the natural passage of the bubbles is not prevented and to avoid static head due to fan pressure. The static head should only be the difference between the specific gravities of the liquid and gases. Instead of the pipes 2 a perforated false bottom to form a gas chamber of suitable cubic content might be used. The liquor level is maintained at the desired height by means of an adjustable sleeve 18 or other suitable means on the overflow pipe 13. A hood 17 and a vent stack 6 therein is utilized for removal of the vapors, the draft being either natural or induced so that no recondensation takes place. The circulating liquor sprays may be conveniently placed and are connected to a supply of dilute liquor through pipes 7 which may form headers and deliver through spray nozzles to spray the whole surface to eliminate foam formation. The pipes 8 from the concentrated liquor supply are also connected to the liquor sprays with an intervening valve 10 to permit recirculation of the concentrated liquor. Pipes 7 and 8 have valves 9 and 10 in the lines. A circulating pump 11 is connected to overflow box 12 containing the partially concentrated liquor. The overflow box 12 communicates by means of overflow pipe 13 with tank 5. The overflow will return to the supply until such time as the density reaches a desired stage when it will flow away to the final concentrator. The concentrated liquor is ultimately withdrawn from container 12 either continuously or intermittently through pipe 14 into storage tank 15. A valve 16 is in pipe line 14.

It should be noted that the liquor is recirculated until the desired density is obtained. This can be accomplished by closing valve 9 and opening valve 10. When the recirculated liquor has reached its desired density it may be drawn from overflow box 12 to concentrated supply tank 15 by opening valve 16. Then valves 10 and 16 are closed and valve 9 opened.

The entire process for the securing of the desired results therefore includes the necessary washing of the pulp to obtain the liquor by any of the usual methods and the filtration of the waste liquors through sand or other medium when desired and the concentration by the method herein described.

What we claim is:

1. The method for the concentration of sulphite waste liquors from the pulp industry which consists in emitting hot flue gases into said waste liquors and bubbling same through a predetermined maintained column of waste liquors, breaking up the bubbles to a predetermined size and exhausting the moisture laden gases while contemporaneously spraying the surfaces of the waste liquor column to maintain its predetermined height and abate any foam.

2. The method of concentrating sulphite waste liquors from the pulp industry which consists in emitting hot flue gases into a body of waste liquor and bubbling said hot flue gases through said body of waste liquor, maintaining the height of said body of waste liquors at a predetermined height by recirculation sprays spraying on the surface of said body of waste liquor, said recirculation sprays fed from an auxiliary source forming the overflow from said body of waste liquor whereby said body of waste liquor and overflow are evaporated continuously by the hot gases until the desired degree of concentration of the waste liquors is reached.

CLARENCE C. HUNICKE.
CHARLES L. WAGNER.